(12) United States Patent
Liu et al.

(10) Patent No.: US 10,284,839 B2
(45) Date of Patent: May 7, 2019

(54) BINOCULAR SEE-THROUGH AR HEAD-MOUNTED DISPLAY DEVICE AND INFORMATION DISPLAY METHOD THEREFOR

(71) Applicant: CHENGDU IDEALSEE TECHNOLOGY CO., LTD., Chengdu, Sichuan (CN)

(72) Inventors: Yinqiu Liu, Sichuan (CN); Xinyu Li, Sichuan (CN)

(73) Assignee: CHENGDU IDEALSEE TECHNOLOGY CO., LTD., Chengdu, Sichuan (CN)

( * ) Notice: Subject to any disclaimer, the term of this patent is extended or adjusted under 35 U.S.C. 154(b) by 116 days.

(21) Appl. No.: 15/545,327

(22) PCT Filed: Aug. 7, 2015

(86) PCT No.: PCT/CN2015/086349
§ 371 (c)(1),
(2) Date: Jul. 21, 2017

(87) PCT Pub. No.: WO2016/115872
PCT Pub. Date: Jul. 28, 2016

(65) Prior Publication Data
US 2018/0295350 A1    Oct. 11, 2018

(30) Foreign Application Priority Data

Jan. 21, 2015  (CN) .......................... 2015 1 0029213

(51) Int. Cl.
*G09G 5/00* (2006.01)
*H04N 13/344* (2018.01)
(Continued)

(52) U.S. Cl.
CPC ............. *H04N 13/344* (2018.05); *G06F 3/01* (2013.01); *G06F 3/012* (2013.01); *G06T 19/006* (2013.01)

(58) Field of Classification Search
CPC . G06F 3/012; G06F 3/01; G06F 3/011; G06F 3/013
See application file for complete search history.

(56) References Cited

U.S. PATENT DOCUMENTS 7,246,904 B2 * 7/2007 Knaan .................... A61B 3/113
                                                            351/206
7,306,337 B2 * 12/2007 Ji ........................... G06F 3/013
                                                            351/209
(Continued)

FOREIGN PATENT DOCUMENTS

CN    2011038527    4/2011
CN    103399629    11/2013
(Continued)

*Primary Examiner* — Vijay Shankar

(57) ABSTRACT

A binocular see-through AR head-mounted display device and an information display method therefor are disclosed. The present invention uses the scene depth image and the user stared point to calculate the position of the target object stared by the user and maps coordinates to the screen coordinate system to determine the overlapping position of AR information. In addition, the present invention can tolerate small changes of human eye sight, and the AR information can be stably stacked in the same position with good robustness. The present invention can distinguish the target object stared by the user from the background, and when the user eye sight is put on different parts of the target object, the AR information is still superimposed at the same position without frequent movement with changes of the eye sight.

16 Claims, 4 Drawing Sheets

(51) Int. Cl.
*G06F 3/01* (2006.01)
*G06T 19/00* (2011.01)

(56) References Cited

U.S. PATENT DOCUMENTS 7,809,160 B2 * 10/2010 Vertegaal ............... A61B 3/113
345/157
2005/0200806 A1 9/2005 Knaan et al.

FOREIGN PATENT DOCUMENTS

CN 103713738 4/2014
WO 2013187116 12/2013

* cited by examiner

BINOCULAR SEE-THROUGH AR HEAD-MOUNTED DISPLAY DEVICE AND INFORMATION DISPLAY METHOD THEREFOR

CROSS REFERENCE OF RELATED APPLICATION

This is a U.S. National Stage under 35 U.S.C. 371 of the International Application PCT/CN2015/086349, filed Aug. 7, 2015, which claims priority under 35 U.S.C. 119(a-d) to CN 201510029213.1, filed Jan. 21, 2015.

BACKGROUND OF THE PRESENT INVENTION

Field of Invention

The present invention relates to a technical field of head-mounted display, and more particularly to a binocular see-through AR head-mounted display device and an information display method therefor.

Description of Related Arts

With the rise of wearable devices, a variety of head-mounted display devices have become research and development hot spots of major industrial giants, and gradually went into the public's horizon. The head-mounted display device is the best application platform for Augmented Reality Technique (AR), which renders the virtual information in a real-world environment through the headset window. However, at present, for most of the conventional AR head-mounted display devices, AR information stacks only consider the correlation with the X and Y axis coordinates of target positions, and do not calculate the depth information of the target. Therefore, the virtual information floats in front of the human eye, and is not highly integrated with the environment, leading to poor user experience. In addition, when the user sight is switched between the target object and the overlapping AR information, since the depths of the two in the user visual range are different, it is necessary to frequently adjust the focal length of the eye to see the contents, which increases burden of user eyes, and even causes discomfort in long-term use.

In the prior art, there are also methods of adjusting the depth of the virtual image on the display, wherein most of them mechanically adjust the optical structure of the optical lens group, thus changing the optical element image distance, so as to realize depth adjustment of the virtual image. However, the methods lead the head-mounted device to be bulky, costly and difficult to control accuracy.

SUMMARY OF THE PRESENT INVENTION

An object of the present invention is to provide a binocular see-through AR (augmented reality) head-mounted display device and an information display method therefor, which automatically adjusts depth of field of virtual information, in such a manner that the virtual information is completely fused with an environment.

Firstly, the present invention provides an information display method for a binocular see-through AR head-mounted display device, wherein a mapping relationship η of pupil center coordinates and stared point screen coordinates, and a mapping relationship δ between stared point coordinates in a scene depth image within a user visual field and the stared point screen coordinates are pre-stored in the binocular see-through AR head-mounted display device; wherein the information display method comprises steps of:

measuring the pupil center coordinates when a user stares at a target object;

calculating the stared point screen coordinates when staring at the target object according to the mapping relationship η and the pupil center coordinates when staring at the target object;

calculating the stared point coordinates in the scene depth image according to the mapping relationship δ and the stared point screen coordinates when staring at the target object;

dividing out an area around a stared point which coincides with a depth of the stared point from the scene depth image according to the stared point coordinates in the scene depth image;

mapping divided area coordinates onto screen coordinates according to the mapping relationship δ, so as to obtain screen coordinate areas; and using the screen coordinate areas as reference positions, and respectively displaying an information source image of virtual information to be displayed on a left part and a right part of an image display source.

Preferably, using the screen coordinate areas as the reference positions, and respectively displaying the information source image of the virtual information to be displayed on the left part and the right part of the image display source specifically comprises:

directly displaying the information source image of the virtual information to be displayed on a left part and a right part of the screen coordinate area; or respectively displaying the information source image of the virtual information to be displayed on the left part and the right part of the image display source with a certain shift according to the screen coordinate area.

Preferably, the mapping relationship η is modified when the user uses the binocular see-through AR head-mounted display device for a first time, or every time the user uses the binocular see-through AR head-mounted display device.

Preferably, a modifying method of the mapping relationship η comprises steps of:

controlling the image display source for displaying a plurality groups of modification images in sequence on the left part and the right part, so as to project virtual overlapping images corresponding to the plurality groups of the modified images in front of the user;

measuring the pupil center coordinates when the user stares at each of the virtual overlapping images, for obtaining the pupil center coordinates corresponding to each of the virtual overlapping images; and using all the pupil center coordinates corresponding to the virtual overlapping images for modifying the mapping relationship η.

Preferably, the mapping relationship η satisfies:

$$(ELnm_1, ERnm_2) \Leftrightarrow f(SLnm_1, SRnm_2);$$

wherein $(ELnm_1, ERnm_2)$ is the pupil center coordinates; $(SLnm_1, SRnm_2)$ is the stared point screen coordinates; wherein $n \in [1,N]$, $m_1 \in [1,M]$, $m_2 \in [1,M]$; N and M are respectively a vertical resolution ratio and a horizontal resolution ration of the left part and the right part of the image display source of the binocular see-through AR head-mounted display device; $f$ is a fitting function.

Secondly, the present invention provides an information display method for a binocular see-through AR head-mounted display device, wherein a mapping relationship of pupil center coordinates and stared point screen coordinates, and a mapping relationship δ between stared point coordinates in a scene depth image within a user visual field and the stared point screen coordinates are pre-stored in the binocular see-through AR head-mounted display device; wherein the information display method comprises steps of:

measuring the pupil center coordinates when a user stares at a target object;

processing the scene depth image with target detection, so as to extract a plurality of optional targets;

calculating the stared point screen coordinates when staring at the target object according to the mapping relationship η and the pupil center coordinates when staring at the target object;

calculating the stared point coordinates in the scene depth image according to the mapping relationship δ and the stared point screen coordinates when staring at the target object;

defining the optional targets containing the stared point coordinates in the scene depth image as stared targets;

mapping stared target coordinates onto screen coordinates according to the mapping relationship δ, so as to obtain screen coordinate areas; and using the screen coordinate areas as reference positions, and respectively displaying an information source image of virtual information to be displayed on a left and a right of an image display source.

Thirdly, the present invention provides an information display method for a binocular see-through AR head-mounted display device, wherein a mapping relationship of pupil center coordinates and stared point screen coordinates, and a mapping relationship δ between stared point coordinates in a scene depth image within a user visual field and the stared point screen coordinates are pre-stored in the binocular see-through AR head-mounted display device; wherein the information display method comprises steps of:

measuring the pupil center coordinates when a user stares at a target object;

dividing areas with different depths in the scene depth image into a plurality of optional stared areas;

mapping optional stared area coordinates onto screen coordinates in sequence according to the mapping relationship δ, so as to obtain optional stared screen areas respectively corresponding to the optional stared areas;

calculating the stared point screen coordinates when staring at the target object according to the mapping relationship η and the pupil center coordinates when staring at the target object; and defining the optional stared screen areas containing the stared point screen coordinates as stared screen areas; and using the stared screen areas as reference positions, and respectively displaying an information source image of virtual information to be displayed on a left and a right of an image display source.

Fourthly, the present invention provides an information display method for a binocular see-through AR head-mounted display device, wherein a mapping relationship η of pupil center coordinates and stared point screen coordinates, and a mapping relationship δ between stared point coordinates in a scene depth image within a user visual field and the stared point screen coordinates are pre-stored in the binocular see-through AR head-mounted display device; wherein the information display method comprises steps of:

measuring the pupil center coordinates when a user stares at a target object;

processing the scene depth image with target detection, so as to extract a plurality of optional targets;

mapping optional target area coordinates onto screen coordinates in sequence according to the mapping relationship δ, so as to obtain optional stared screen areas respectively corresponding to the optional targets;

calculating the stared point screen coordinates when staring at the target object according to the mapping relationship η and the pupil center coordinates when staring at the target object; and defining the optional stared screen areas containing the stared point screen coordinates as stared screen areas; and using the stared screen areas as reference positions, and respectively displaying an information source image of virtual information to be displayed on a left and a right of an image display source.

fifthly, the present invention provides a binocular see-through AR head-mounted display device, comprising: an image display source, an eye movement tracing module, and a data processing module; wherein a mapping relationship η of pupil center coordinates and stared point screen coordinates, and a mapping relationship δ between stared point coordinates in a scene depth image within a user visual field and the stared point screen coordinates are pre-stored in the data processing module;

wherein the eye movement tracing module is adopted for measuring the pupil center coordinates when a user stares at a target object;

wherein the data processing module is adopted for calculating the stared point screen coordinates when staring at the target object according to the mapping relationship and the pupil center coordinates when staring at the target object; calculating the stared point coordinates in the scene depth image according to the mapping relationship δ and the stared point screen coordinates when staring at the target object; dividing out an area around a stared point which coincides with a depth of the stared point from the scene depth image according to the stared point coordinates in the scene depth image; and mapping divided area coordinates onto screen coordinates according to the mapping relationship δ, so as to obtain screen coordinate areas;

wherein the image display source is adopted for using the screen coordinate areas as reference positions, and respectively displaying an information source image of virtual information to be displayed on a left and a right of the image display source.

Preferably, the binocular see-through AR head-mounted display device further comprises a depth image acquisition module for collecting the scene depth image.

Preferably, the depth image acquisition module comprises an infrared grating launcher and an infrared camera.

Preferably, the depth image acquisition module further comprises a color camera for processing the scene depth image with target detection.

Preferably, the depth image acquisition module is a binocular range system formed by two color cameras.

The conventional depth of field adjustment is to change an image distance of an optical element. However, the present invention breaks conventional thinking, which adjusts display positions of a left group and a right group of effective displayed images for depth of field adjustment without changing a structure of an optical device. The present invention is novel and practical compared to changing an optical focal length.

The present invention uses the scene depth image and the user stared point to calculate the position of the target object stared by the user and maps coordinates to the screen coordinate system to determine the overlapping position of AR information, which can tolerate small changes of human eye sight, and the AR information can be stably stacked in the same position with good robustness. In addition, the present invention can distinguish the target object stared by the user from the background, and when the user eye sight is put on different parts of the target object, the AR information is still superimposed at the same position without frequent movement with changes of the eye sight.

BRIEF DESCRIPTION OF THE DRAWINGS

In order to more clearly illustrate the embodiments of the present invention or the technical solutions in the prior art, the following drawings, which are to be used in the description of the embodiments or the prior art, will be briefly described. It will be apparent that the drawings in the following description are some embodiments of the present invention, and for the benefit of one of ordinary skill in the art, other drawings may be obtained from these drawings without departing from the inventive labor.

DETAILED DESCRIPTION OF THE PREFERRED EMBODIMENT

The embodiments of the present invention will now be described in conjunction with the accompanying drawings in the embodiments of the present invention, and it will be apparent that the described embodiments are merely part of the embodiments of the invention and are not intended to be exhaustive. All other embodiments obtained by those of ordinary skill in the art without making creative work are within the scope of the present invention, based on embodiments of the invention.

Figure 1:
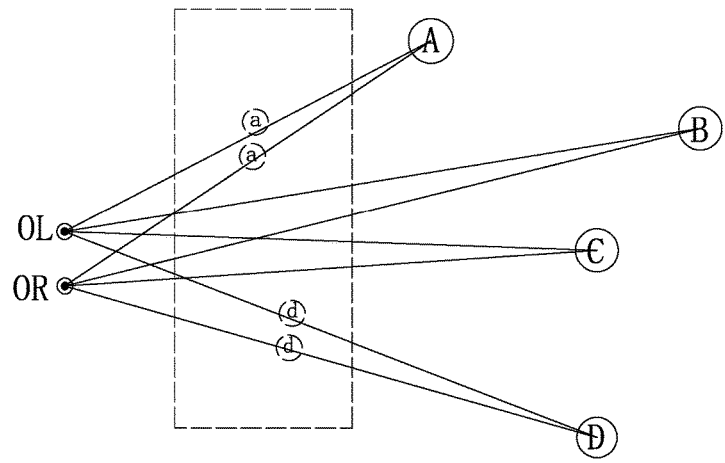
FIG. 1 is a sketch view of human eye spatial sight path.

The applicant has noticed that the viewing angles of the left and the right eye are different when the user stares at the object at different positions. Referring to FIG. 1, A/B/C/D denotes object at different position in the space. While people stares at the object A, the directions of the line-of-sight of the left and the right eye are space vectors OLA and ORA respectively. In the AR (augmented reality) head-mounted device field, the left and the right eye of the user observe a left and a right virtual image respectively through the binocular head-mounted device. When the line-of-sight of the left eye staring at the left virtual image converges with the line-of-sight of the right eye staring at the right virtual image in the space, an overlapped virtual image at a distance from the user is observed. The distance from the virtual image to the human eyes is decided by the space viewing vector (line-of-sight) composed of the left and the right virtual image with the left and the right eye respectively.

As shown in FIG. 1, the user observes the virtual image a through the binocular see-through AR head-mounted device. When the left and the right line-of-sight space vector of the left eye observing the left virtual image a and the right eye observing the right virtual image comply with the space vector OLA and ORA respectively, the user will observe an overlapped virtual image formed by the left and the right image through the head-mounted device. The overlapped virtual image a has identical space position with the object A. Based on the theory, the present invention realizes a real-time virtual image overlap in any space position and truly realizes the augmented virtual reality.

The present invention adopts an eye movement tracing system which is briefly described as below. Eye movement tracing is to capture the user's current "viewing direction" by using electronic/optical test means and to collect the line-of-sight changing parameters among the position changing features and the unchanging features of the eye structure the relative position of which is not change while the eyeballs rotates and the unchanging features are taken as a reference. Then achieving the line-of-sight through geometry model or mapping model. The collected features are categorized in 3 groups: 1) vectors of the center of the pupils and the corneal reflex; 2) corneal reflex matrix; 3) the oval border of the iris. The video-oculography (VOG) based on the eye video analysis generally adopts the pupil-corneal reflex method which captures the direction of the line-of-sight by tracking the relative position of the pupil center and the corneal reflex. The corneal reflex is a virtual image formed by reflection of the light source (commonly adopts near infrared light source) on the surface of the corneal and the camera captures the virtual image formed in real pupil after refraction by the corneal. The eye movement tracing system based on the pupil-corneal reflex comprises a near infrared light source (850 nm), infrared camera, image capture card and data processing CPU. The image in the eyes captured by the charged couple device (CCD) is transported to the computer and is processed; the information of the position of the pupil center and facula is collected.

According to preferred embodiments of the present invention, a mapping relationship η of pupil center coordinates and stared point screen coordinates, and a mapping relationship δ between stared point coordinates in a scene depth image within a user visual field and the stared point screen coordinates are pre-stored in the head-mounted device. The mapping relationships η and δ are obtained according to parameter calculation or offline calibration before leaving a factor, and a calibration method will be described in the following examples in detail. The mapping relationships η and δ are both able to be a matrix. According to the preferred embodiments of the present invention, matrixes are used as examples. The mapping relationship η is a matrix $M_{es}$, the mapping relationship δ is a matrix $M_{sd}$, and an inverse mapping matrix thereof is $M_{sd}$. $M_{sd}$ is a generalized inverse matrix of $M_{ds}$.

The stared point screen coordinates described in the preferred embodiments of the present invention are defined as follows: in the binocular head-mounted device, a light from the stared pointed enters human eyes through a lens, and a screen light also enters the human eye through the lens. Through the lens, the user can see that the stared point coincides with a virtual point displayed on the screen, and the virtual point is displayed on an image displayer of the binocular head-mounted device as a left one and a right one. Thus, a stared point corresponds to a pair of screen coordinates, which is called the stared point screen coordinates, and coordinate values thereof equal to coordinate values of the stared point when being mapped to the screen.

The stared point depth image coordinates are defined as follows: the stared point coordinates in the scene depth image.

Preferred Embodiment 1

Figure 2:
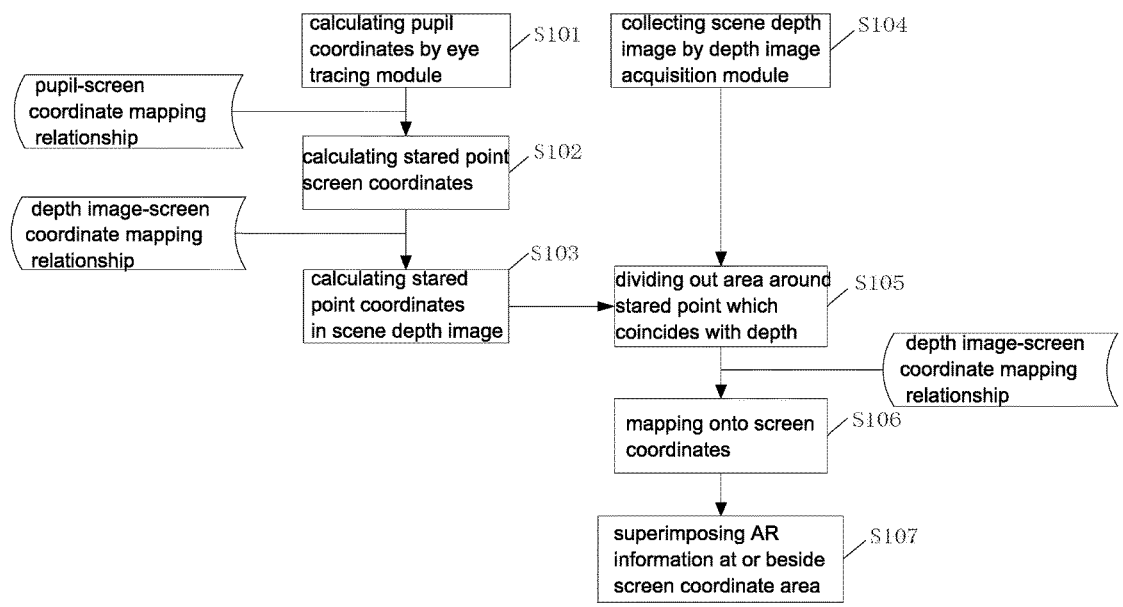
FIG. 2 is a flow chart of an information display method for a binocular see-through AR head-mounted display device according to a preferred embodiment 1 of the present invention.

Referring to FIG. 2, a flow chart of an information display method for a binocular see-through AR head-mounted display device according to a preferred embodiment 1 of the present invention is illustrated. According to the preferred embodiment 1, the information display method comprises steps S101 to S107 as follows.

S101: using an eye movement tracing module for measuring pupil center coordinates. When a user sees an external environment through the head-mounted device, the eye movement tracing module real-time traces sight changes of eye balls. When the user stares at a target object, left and right pupil center coordinates $(x_e^l, y_e^l)$, $(x_e^r, y_e^r)$ are recorded, and are sent to a data processing module.

S102: calculating stared point screen coordinates. The data processing module converts the pupil center coordinates into the stared point screen coordinates $(x_s^l, y_s^l)$ and $(x_s^r, y_s^r)$ according to the mapping relationship η; wherein:

$$(x_s^l, y_s^l, x_s^r, y_s^r) = (x_e^l, y_e^l, x_e^r, y_e^r) \square M_{es}$$

S103: calculating stared point coordinates in a scene depth image. The data processing module converts the stared point screen coordinates into the stared point coordinates $(x_d, y_d, \text{depth})$ in the scene depth image according to the mapping relationship δ (to be precise, according to the inverse mapping relationship of δ; since the inverse mapping relationship is able to be calculated with δ, saying according to the mapping relationship δ is also proper); wherein:

$$(x_d, y_d, \text{depth}) = (x_s^l, y_s^l, x_s^r, y_s^r) \square M_{sd}$$

S104: real-time collecting the scene depth image within user vision with a depth image acquisition module.

S105: dividing out an area around a stared point which coincides with a depth of the stared point from the scene depth image according to the stared point coordinates $(x_d, y_d, \text{depth})$ in the scene depth image, forming a coordinate collection $T_d$ with a contour of a divided area (or forming a collection with all points in the divided area).

$$T_d = \begin{bmatrix} x_d^{(1)} & y_d^{(1)} & \text{depth}^{(1)} \\ x_d^{(2)} & y_d^{(2)} & \text{depth}^{(2)} \\ \vdots & \vdots & \vdots \\ x_d^{(n)} & y_d^{(n)} & \text{depth}^{(n)} \end{bmatrix}$$

S106: mapping the divided area coordinates onto screen coordinates according to the mapping relationship δ, so as to obtain corresponding screen coordinate areas. That is to say, the coordinate collection $T_d$ obtained in S105 is converted into a screen coordinate collection $T_s$;

$$T_s = T_d \square M_{ds}$$

$$T_s = \begin{bmatrix} x_s^{l(1)} & y_s^{l(1)} & x_s^{r(1)} & y_s^{r(1)} \\ x_s^{l(2)} & y_s^{l(2)} & x_s^{r(2)} & y_s^{r(2)} \\ \vdots & \vdots & \vdots & \vdots \\ x_s^{l(n)} & y_s^{l(n)} & x_s^{r(n)} & y_s^{r(n)} \end{bmatrix}$$

wherein the screen coordinate collection $T_s$ is the screen coordinate areas of the target object currently stared by the user.

S107: overlapping AR information in an area of $T_s$ or at a proper position beside the area, which means using the screen coordinate areas as reference positions, and respectively displaying an information source image of virtual information to be displayed on a left part and a right part of an image display source. Using the screen coordinate areas as the reference positions means directly displaying the information source image of the virtual information to be displayed on a left part and a right part of the screen coordinate area, in such a manner that the user synchronically sees virtual information at a position of the target object through the head-mounted device; or respectively displaying the information source image of the virtual information to be displayed on the left part and the right part of the image display source with a certain shift according to the screen coordinate area, in such a manner that the user synchronically sees virtual information at a position near the target object through the head-mounted device.

Preferred Embodiment 2

Figure 3:
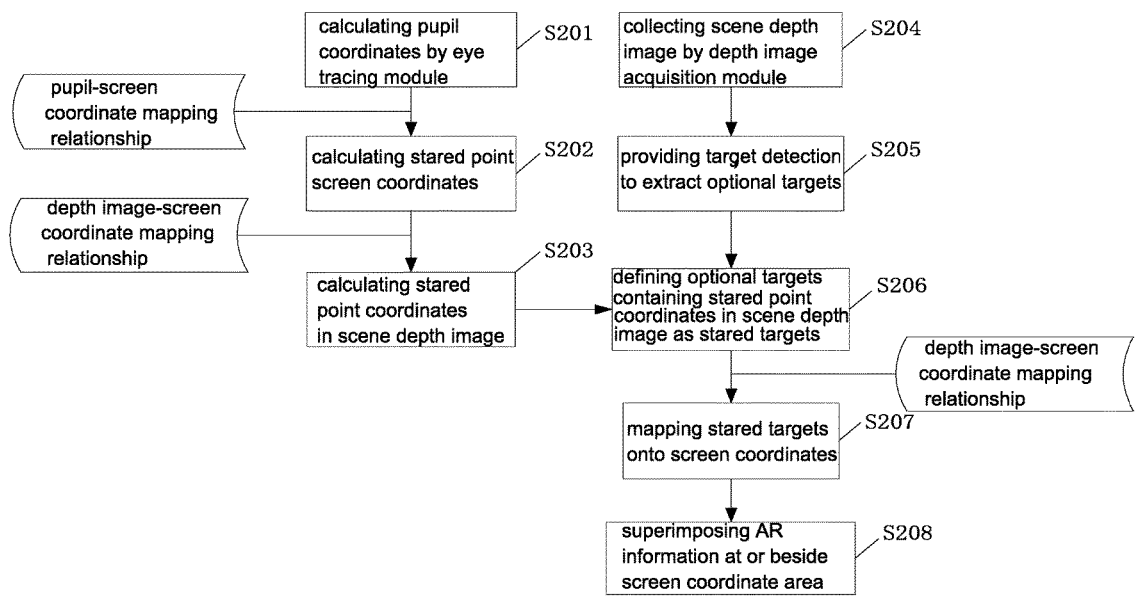
FIG. 3 is a flow chart of an information display method for a binocular see-through AR head-mounted display device according to a preferred embodiment 2 of the present invention.

Referring to FIG. 3, a flow chart of an information display method for a binocular see-through AR head-mounted display device according to a preferred embodiment 2 of the present invention is illustrated. According to the preferred embodiment 2, the information display method comprises steps S201 to S208 as follows.

S201: using an eye movement tracing module for measuring pupil center coordinates. When a user sees an external environment through the head-mounted device, the eye movement tracing module real-time traces sight changes of eye balls. When the user stares at a target object, left and right pupil center coordinates $(x_e^l, y_e^l)$, $(x_e^r, y_e^r)$ are recorded, and are sent to a data processing module.

S202: calculating stared point screen coordinates. The data processing module converts the pupil center coordinates into the stared point screen coordinates $(x_s^l, y_s^l)$ and $(x_s^r, y_s^r)$ according to the mapping relationship η; wherein:

$$(x_s^l, y_s^l, x_s^r, y_s^r) = (x_e^l, y_e^l, x_e^r, y_e^r) \square M_{es}$$

S203: calculating stared point coordinates in a scene depth image. The data processing module converts the stared point screen coordinates into the stared point coordinates $(x_d, y_d, \text{depth})$ in the scene depth image according to the mapping relationship δ (to be precise, according to the inverse mapping relationship of δ; since the inverse mapping relationship is able to be calculated with δ, saying according to the mapping relationship δ is also proper); wherein:

$$(x_d, y_d, \text{depth}) = (x_s^l, y_s^l, x_s^r, y_s^r) \square M_{sd}$$

S204: real-time collecting the scene depth image within user vision with a depth image acquisition module.

S205: processing the scene depth image with target detection, so as to extract a plurality of optional targets.

S206: defining the optional targets containing the stared point coordinates $(x_d, y_d, \text{depth})$ in the scene depth image as stared targets.

S207: mapping the stared target onto screen coordinates according to the mapping relationship δ, so as to obtain screen coordinate areas. During mapping, only a collection formed by a contour is mapped, or a collection formed by all points in the stared target is mapped.

S208: overlapping AR information in the screen coordinate areas or at proper positions beside the screen coordinate areas.

Preferred Embodiment 3

Figure 4:
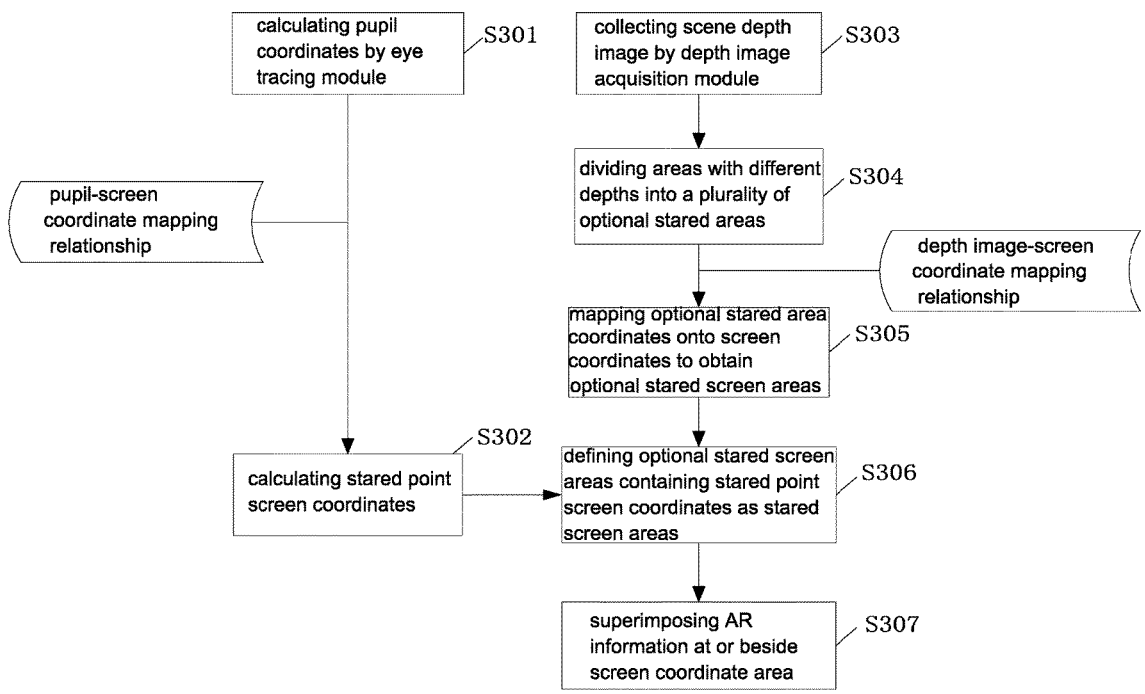
FIG. 4 is a flow chart of an information display method for a binocular see-through AR head-mounted display device according to a preferred embodiment 3 of the present invention.

Referring to FIG. 4, a flow chart of an information display method for a binocular see-through AR head-mounted display device according to a preferred embodiment 3 of the present invention is illustrated. According to the preferred embodiment 3, the information display method comprises steps S301 to S307 as follows.

S301: using an eye movement tracing module for measuring pupil center coordinates. When a user sees an external environment through the head-mounted device, the eye movement tracing module real-time traces sight changes of eye balls. When the user stares at a target object, left and right pupil center coordinates $(x_e^l, y_e^l)$, $(x_e^r, y_e^r)$ are recorded, and are sent to a data processing module.

S302: calculating stared point screen coordinates. The data processing module converts the pupil center coordinates into the stared point screen coordinates $(x_s^l, y_s^l)$ and $(x_s^r, y_s^r)$ according to the mapping relationship η; wherein:

$$(x_s^l, y_s^l, x_s^r, y_s^r) = (x_e^l, y_e^l, x_e^r, y_e^r) \square M_{es}$$

S303: real-time collecting the scene depth image within user vision with a depth image acquisition module.

S304: dividing areas with different depths in the scene depth image into a plurality of optional stared areas. For example, dividing the scene depth image into m areas based on depth information, extracting contours for each of the areas, so as to obtain m coordinate collections $T_d^{(1)}, T_d^{(2)}, T_d^{(3)}, \ldots, T_d^{(m)}$ (or mapping a collection formed by all points); wherein $$T_d^{(k)} = \begin{bmatrix} x_d^{(1)(k)} & y_d^{(1)(k)} & depth^{(1)(k)} \\ x_d^{(2)(k)} & y_d^{(2)(k)} & depth^{(2)(k)} \\ \vdots & \vdots & \vdots \\ x_d^{(n)(k)} & y_d^{(n)(k)} & depth^{(n)(k)} \end{bmatrix} \quad k = 1, 2, 3, \ldots m.$$

S305: mapping all optional stared area coordinates onto screen coordinates in sequence according to the mapping relationship δ (i.e. the inverse mapping relationship of δ), so as to obtain optional stared screen areas respectively corresponding to the optional stared areas. That is to say, the m coordinate collections $T_d^{(1)}, T_d^{(2)}, T_d^{(3)}, \ldots, T_d^{(m)}$ are converted into m screen coordinate collections $T_s^{(1)}, T_s^{(2)}, T_s^{(3)}, \ldots, T_s^{(m)}$; wherein $$T_s^{(k)} = T_d^{(k)} \square M_{ds}, k = 1, 2, 3, \ldots, m.$$

S306: defining the optional targets containing the stared point coordinates in the scene depth image as stared targets, which means screening out a collection from the m screen coordinate collections $T_s^{(1)}, T_s^{(2)}, T_s^{(3)}, \ldots, T_s^{(m)}$ where the stared point coordinates obtained in S302 are located.

S307: overlapping AR information in the screen coordinate areas or at proper positions beside the screen coordinate areas.

Preferred Embodiment 4

Figure 5:
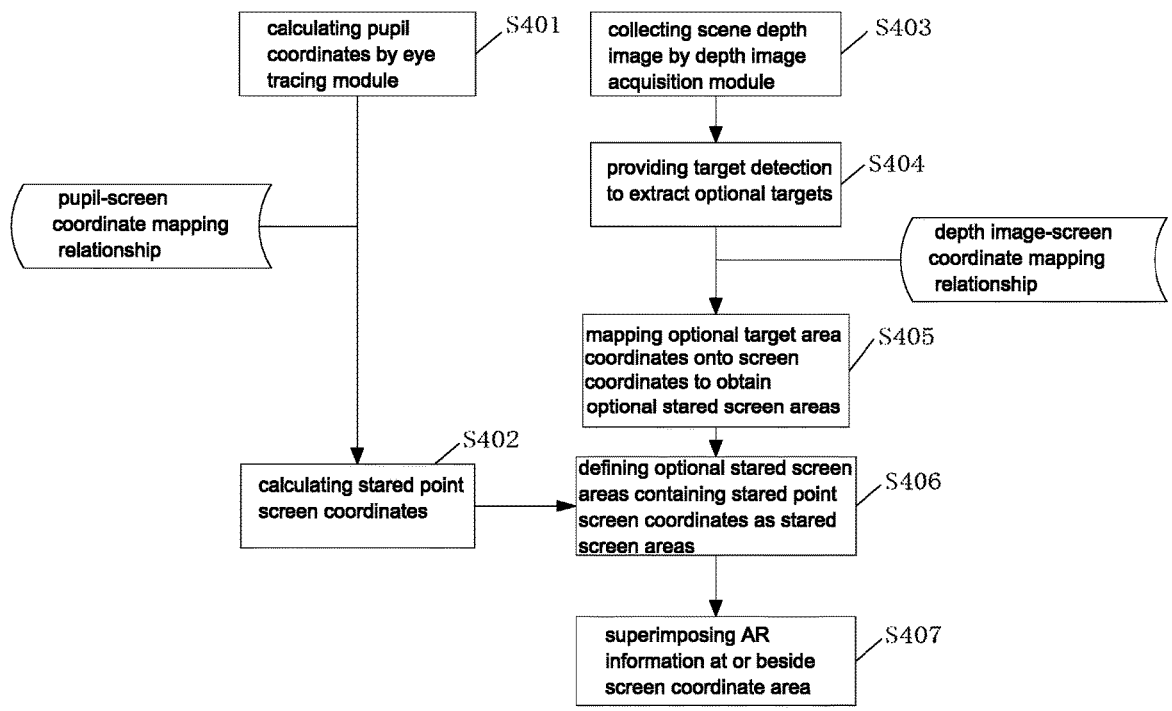
FIG. 5 is a flow chart of an information display method for a binocular see-through AR head-mounted display device according to a preferred embodiment 4 of the present invention.

Referring to FIG. 5, a flow chart of an information display method for a binocular see-through AR head-mounted display device according to a preferred embodiment 4 of the present invention is illustrated. According to the preferred embodiment 4, the information display method comprises steps S401 to S407 as follows.

S401: using an eye movement tracing module for measuring pupil center coordinates. When a user sees an external environment through the head-mounted device, the eye movement tracing module real-time traces sight changes of eye balls. When the user stares at a target object, left and right pupil center coordinates $(x_e^l, y_e^l)$, $(x_e^r, y_e^r)$ are recorded, and are sent to a data processing module.

S402: calculating stared point screen coordinates. The data processing module converts the pupil center coordinates into the stared point screen coordinates $(x_s^l, y_s^l)$ and $(x_s^r, y_s^r)$ according to the mapping relationship η; wherein:

$$(x_s^l, y_s^l, x_s^r, y_s^r) = (x_e^l, y_e^l, x_e^r, y_e^r) \square M_{es}$$

S403: real-time collecting the scene depth image within user vision with a depth image acquisition module.

S404: processing the scene depth image with target detection, so as to extract a plurality of optional targets.

S405: mapping all optional target area coordinates onto screen coordinates in sequence according to the mapping relationship δ by the data processing module (during mapping, only a collection formed by a contour is mapped, or a collection formed by all points in the stared target is mapped), so as to obtain optional stared screen areas respectively corresponding to the optional targets.

S406: defining the optional stared screen areas containing the stared point screen coordinates as stared screen areas.

S407: overlapping AR information in the screen coordinate areas or at proper positions beside the screen coordinate areas.

Preferred Embodiment 5

A binocular see-through AR head-mounted display device is illustrated, comprising: an optical module, an image display source, an eye movement tracing module, a depth image acquisition module, and a data processing module. The image display source comprises a left screen and a right screen, or the image display source is a screen divided into a left displaying area and a right displaying area for displaying AR information. The optical module comprises one or a plurality of lenses, the user synchronically sees a real external environment and the virtual information on the image display source through the optical module. A mapping relationship η of pupil center coordinates and stared point screen coordinates, and a mapping relationship δ between stared point coordinates in a scene depth image within a user visual field and the stared point screen coordinates are stored in the data processing module.

The depth image acquisition module is adopted for real-time collecting the scene depth image within user vision. The depth image acquisition module has two embodiments: firstly, the depth image acquisition module comprises an infrared grating launcher and an infrared camera; secondly, the depth image acquisition module is a binocular range system formed by two color cameras. Compared with the second embodiment, the first one is better because when the head-mounted device is incorrectly worn or a user head moves, a relative position relationship of the two color cameras of the second embodiment will be changed, which lowering accuracy of depth data.

The eye movement tracing module is adopted for real-time tracing sight changes of eye balls. When the user stares at a target object, the pupil center coordinates of the user are recorded and sent to the data processing module. When the eye movement tracing module uses an infrared ray, the infrared ray from an infrared source enters human eyes, and an infrared ray reflected from corneas and pupils are recorded by an infrared camera, so as to obtain eye ball images.

The data processing module is adopted for calculating screen coordinate areas corresponding to user stared areas based on data transmitted by the depth image acquisition module and the eye movement tracing module; and controlling the image display source, so as to the screen coordinate areas as reference positions, and respectively display an information source image of virtual information to be displayed on a left and a right of the image display source. A calculation method for calculating the screen coordinate areas corresponding to the user stared areas is described in the preferred embodiments 1-4, and will not be described again.

An additional module is a target identification module. If the depth image acquisition module adopts an infrared embodiment, then a color camera is needed for processing the scene depth image with target detection. If a binocular range embodiment is used, one of the two color cameras is used for processing the scene depth image with target detection. Using the target identification module is able to more precisely separate the object target from other object areas than only using the depth image (especially when the user stares at an object next to the target object and having a same depth). Meanwhile, target identification is a key step for obtaining target-related AR information.

According to the preferred embodiments of the present invention, the mapping relationships $\eta$ and $\delta$ are obtained according to parameter calculation or offline calibration before leaving a factor. Calibration of $\eta$ are described as an example as follows.

Calculating the mapping relation $\eta$ comprises steps of:

collecting data of Q test users by the eye movement tracing system, wherein each user observes K sets of bitmap respectively to calibrates the mapping relation $\eta$; assuming the left and right part of the image display source of the head-mounted device both has pixel bitmap N*M, that is the horizontal pixel is M and the vertical pixel is N.

each test user observing K sets of bitmap comprises steps of A to C:

Step A: displaying two identical H*G bitmap on the left and right part of the image display source on the head-mounted device; as shown in FIG. 3 the center to center distance of the two sets of bitmaps is p1 and the distance between the main optical axes of the two sets of optical system on the head-mounted device is P, wherein p1<=P, G<=M, H<=N, G; the value of the G is more approaching M the value of H is more approaching N and the test result is more accurate; big G and H value requires too many test points which induce dizzy and asthenopia for the user, so appropriate values need to be assigned to G and H according to different situations;

Step B: displaying each pixel pair in the left and the right bitmap by the image display source in sequence while test the test users, wherein (L11, R11), (L21, R21), (L31, R31), ... (LHG$_1$, RHG$_2$); displaying one pair of the pixel a time (Lhg$_1$, Rhg$_2$), wherein h $\in$ [1,H], g$_1$$\in$[1,G], g$_2$$\in$[1,G]; the test user stares at the virtual bitmap projected in front of the human eyes through the head-mounted device; recording the line-of-sight information data in eye-centered coordinate (the pupil center coordinates) while the user stares at each virtual bitmap by the eye movement tracing system to achieve a set of data; setting the coordinate positions (the stared point screen coordinates) of a pair of the left and right bitmap on the image display source of the head-mounted device as (SLxhg$_1$,SLyhg$_2$), (SRxhg$_1$,SRyhg$_2$), wherein h $\in$ [1,H], g$_1$$\in$[1,G], g$_2$$\in$[1,G]; displaying each pixel pair on the image display source in sequence; with the help of the eye movement tracing module, recording the pupil center coordinates of the left and right eyeballs while the user observes (stares) at the virtual enlarged and overlapped bitmaps corresponding to (SLxhg$_1$,SLyhg$_2$), (SRxhg$_1$,SRyhg$_2$) through the window on the head-mounted device; denoting the coordinates as (ELxhg$_1$, ELyhg$_2$), (ERxhg$_1$, ERyhg$_2$); thus achieving the coordinates of H*G sets of bitmaps on the image display source and the corresponding left and right eyes space line-of-sight information data;

achieving a set of mapping relation between the coordinates of each pixel pair on the image display source and the left and right eye space line-of-sight information data:

$$(ELhg_1, ERhg_2) \Leftrightarrow f(SLhg_1, SRhg_2)$$

wherein, h $\in$ [1,H], g$_1$$\in$[1,G], g$_2$$\in$[1,G]; H and G are the vertical resolution and the horizontal resolution of the left and the right bitmap respectively; $f$ is the fitting function;

Step C: reducing the center to center distance d1 of the left and the right bitmap displayed on the image display source according to certain rules (such as reducing d1 in same step in sequence, or reducing d1 according to the exponential function etc.); For example, reducing i pixel symmetrically in sequence; repeating the step B after each reduction of d1; achieving K set of data after K operation; each data is the mapping relation between the coordinates of the pixel pair on the image display source and the line-of-sight information data in eye-centered coordinate:

$$(ELhg_1, ERhg_2)_1 \Leftrightarrow (SLhg_1, SRhg_2)_1$$
$$(ELhg_1, ERhg_2)_2 \Leftrightarrow (SLhg_1, SRhg_2)_2$$
$$\vdots$$
$$(ELhg_1 ERhg_2)_K \Leftrightarrow (SLhg_1, SRhg_2)_K$$

Achieving the line-of-sight information data in eye-centered coordinate corresponding to the coordinates of H*G pairs of pixel pair on the display screen in each test; after K test on the user, the line-of-sight information data in eye-centered coordinate corresponding to the K*H*G pairs of pixel pair on the display screen is achieved; fitting the K*H*G sets of data to achieve fitting curve function f of the coordinates of the left and right pixel pair on the display screen and the line-of-sight information data in eye-centered coordinate; substituting the coordinate data into the fitting curve function f to calculate the corresponding line-of-sight information data in eye-centered coordinate based on the achieved fitting curve function f and the existing coordinate data of the left and right pixel pair on the display screen; the pixel of the left and right display screen is N*M and the pixel pair is N*(M*N).

$$\begin{cases} f(SL1m_1, SR1m_2) \Leftrightarrow (EL1m_1, ER1m_2) \\ f(SL2m_1, SR2m_2) \Leftrightarrow (EL2m_1, ER2m_2) \\ f(SL3m_1, SR3m_2) \Leftrightarrow (EL3m_1, ER3m_2) \\ \vdots \\ f(SLNm_1, SRNm_2) \Leftrightarrow (ELNm_1, ERNm_2) \end{cases}$$

A variable n is introduced, wherein n $\in$ [1,N] and the formula is simplified as below:

$$f(SLnm_1, SRnm_2) \Leftrightarrow (ELnm_1, ERnm_2)$$

wherein $(ELnm_1, ERnm_2)$ is line-of-sight information data in eye-centered coordinate; $(SLnm_1, SRnm_2)$ is left and right pixel point pair coordinates of the image display source; $n \in [1,N]$, $m_1 \in [1,M]$, $m_2 \in [1,M]$; N and M are the vertical resolution and horizontal resolution of the left and the right part of the image display source respectively; $f$ is the fitting function.

When Q=1, that is just one test user, the mapping relation η is as follow:

$$f(SLnm_1, SRnm_2) \Leftrightarrow (ELnm_1, ERnm_2)$$

If Q≠1, test the Q test user to achieve Q sets of mapping relation:

$$\{f(SLnm_1, SRnm_2)\}_1 \Leftrightarrow (ELnm_1, ERnm_2)_1$$
$$\{f(SLnm_1, SRnm_2)\}_2 \Leftrightarrow (ELnm_1, ERnm_2)_2$$
$$\vdots$$
$$\{f(SLnm_1, SRnm_2)\}_Q \Leftrightarrow (ELnm_1, ERnm_2)_Q$$

Interpolating the fitting of the Q sets of data to achieve the mapping relation η between the coordinate date of the bitmap pair on the image display source and the line-of-sight information data in eye-centered coordinate:

$$(ELnm_1, ERnm_2) \Leftrightarrow f(SLnm_1, SRnm_2, t)$$

wherein t is the correction factor of the Q sets of data fitting.

Testing the Q test users to achieve Q*(K*H*G) sets of data on the screen pixel pairs and the line-of-sight information data in eye-centered coordinate; achieving the calculated line-of-sight information data in eye-centered coordinate corresponding to each pair of modified pixels according to the mapping relation η; comparing the calculated line-of-sight information data in eye-centered coordinate with the recorded test data to calculate a compensating factor t for minimizing the root-mean-square error of the calculated data and the test data; the compensating factor is also the correction factor of the mapping relation η.

In the function expression, t is able to be merged into the function; denoting the fitting function merged with the correction factor t as $f_1$ and the mapping relation η is further expressed as:

$$(ELnm_1, ERnm_2) \Leftrightarrow f_1(SLnm_1, SRnm_2).$$

Due to the differences in the users' line-of-sight, when the user initially uses the head-mounted device, a simple calibration on the line-of-sight is needed for better results; similar calibration method for the mapping relation η is adopted for the initial simple calibration to correct the mapping relation η until the mapping relation is appropriate for the user. During each use, the wearing position is slightly different which requires correction for the mapping relation η in the same way. The correction mapping relation η is expressed as:

$$f(ELnm_1, ERnm_2, w) \Leftrightarrow (ELnm_1, ERnm_2)$$

wherein w is the correction factor.

The method of correcting the mapping relation η to suit the user comprises steps of: displaying multiple sets of modified images on the left and right part respectively by the image display source while the user initially uses the head-mounted device; the user staring at the overlapped virtual image in front of the human eyes through the head-mounted devices; calculating the line-of-sight information data in eye-centered coordinate while the user stares at each overlapped virtual image in sequence by the eye movement tracing module; correcting the mapping relation η to suit the user according to the user's data by the data processing module; the modified data is designed as a graph or bitmap; taking bitmap as an example: displaying each pixel pair in the left and right modified bitmaps by the image display source; the user staring at the virtual bitmap projected in front of the eyes; recording the line-of-sight information data in eye-centered coordinate information data while the user stares at each virtual bitmap by the eye movement tracing module in sequence; achieving a set of data of the user; correcting the mapping relation η to suit the user according to the user's data by the data processing module.

Achieving a set of coordinates of the pixel pair of the modified image on the display screen recorded by the system while the calibration test for the device while the initial use by the user and the corresponding line-of-sight information data in eye-centered coordinate information data of the user. The modified bitmap is a bitmap with r rows and s columns, wherein r and s are positive integers bigger than 1 and less than 10; such as a 5*5 bitmap.

$$f(SLrs_1, SRrs_2) \Leftrightarrow (ELrs_1, ERrs_2)$$

wherein $r \in [1,R]$, $s_1 \in [1,S]$, $s_2 \in [1,S]$; R and S are the vertical resolution and the horizontal resolution of the modified bitmap respectively; $f$ is the fitting function.

Based on the mapping relation η, achieving the calculated line-of-sight information data in eye-centered coordinate information data $(ELrs_1, ERrs_2)_{CAC}$ corresponding to each modified pixel pair $(SLrs_1, SRrs_2)$; comparing the calculated line-of-sight information data in eye-centered coordinate with the recorded test data $(SLrs_1, SRrs_2)$ to calculate a compensating coefficient w to minimize the root-mean-square error of the calculated data and the test data, wherein the compensating coefficient is the correction factor of the mapping relation η.

The wearing position is slightly different while each use of the head-mounted device, so a correction for η is needed. Similar correction method as for the initial correction is adopted. More pixels of the correction bitmap are able to be displayed while initial use, such as 12. Four correction pixels are displayed to reduce error caused by different wearing position while each use by the user after the initial use. The modified mapping relation η is expressed as:

$$f(SLrs_1, SRrs_2, w) \Leftrightarrow (ELrs_1, ERrs_2)$$

wherein w is the correction factor.

The mapping relationship δ is expressed as the mapping relationship between stared point coordinates in the scene depth image and the stared point screen coordinates. When a camera position of the head-mounted device is fixed, the mapping relationship is constant. A calibration method thereof requires an external camera for shooting an external calibration plot, wherein external calibration plot coordinates in an external camera image are mapped onto a screen of the image display source, and when the user sees the target positions overlapped through the lens, the mapping relationship is obtained. In order to achieve automatic calibration, the calibration method can also use a camera to simulate the human eye (for judging with the camera instead of the human eye) to capture images on the image display screen, wherein the mapping relationship δ can be obtained by mapping imaged captured by two cameras.

In another patent application of the present applicant, an information display method is disclosed, wherein an eye movement tracing module is added to a binocular see-through AR head-mounted device for real-time measuring human eye pupil positions, and calculating a stared point on the screen with a current user sight based on an offline-calculated relationship between human pupil coordinates and user stared point coordinates on a left screen and a right screen of the head-mounted device, so as to superimpose AR information at stared point on the left screen and the right screen, in such a manner that the AR information coincides with a depth of a target. As the human eye cannot accurately stare at a same point, a small movement of a pupil position will cause a large change of the stared point on the screen, showing sight "shifting" with continuously moving AR information. Although improvement is available by filtering or other methods to a certain extent, the problem cannot be completely resolved in order to achieve a good user experience.

The present invention uses the scene depth image and the user stared point to calculate the position of the target object stared by the user and maps coordinates to the screen coordinate system to determine the overlapping position of AR information, which can tolerate small changes of human eye sight, and the AR information can be stably stacked in the same position with good robustness. In addition, the present invention can distinguish the target object stared by the user from the background, and when the user eye sight is put on different parts of the target object, the AR information is still superimposed at the same position without frequent movement with changes of the eye sight.

All of the features disclosed in this specification, or all of the methods or processes disclosed therein, may be combined in any manner other than mutually exclusive features and/or steps.

Any feature disclosed in this specification (including any additional claims, abstracts and drawings), unless specifically stated, may be replaced by other equivalents with equivalent or similar purposes. That is, unless specifically described, each feature is only an example of a series of equivalent or similar features.

The present invention is not limited to the specific embodiments described above. The present invention extends to any new feature or any new combination disclosed in this specification, as well as any new method or process of disclosure or any new combination disclosed.

What is claimed is:

1. A binocular see-through AR head-mounted display device, comprising: an image display source, an eye movement tracing module, and a data processing module; wherein a mapping relationship $\eta$ of pupil center coordinates and stared point screen coordinates, and a mapping relationship $\delta$ between stared point coordinates in a scene depth image within a user visual field and the stared point screen coordinates are pre-stored in the data processing module;

wherein the eye movement tracing module is adopted for measuring the pupil center coordinates when a user stares at a target object;

wherein the data processing module is adopted for calculating the stared point screen coordinates when staring at the target object according to the mapping relationship $\eta$ and the pupil center coordinates when staring at the target object; calculating the stared point coordinates in the scene depth image according to the mapping relationship $\delta$ and the stared point screen coordinates when staring at the target object; dividing out an area around a stared point which coincides with a depth of the stared point from the scene depth image according to the stared point coordinates in the scene depth image; and mapping divided area coordinates onto screen coordinates according to the mapping relationship $\delta$, so as to obtain screen coordinate areas;

wherein the image display source is adopted for using the screen coordinate areas as reference positions, and respectively displaying an information source image of virtual information to be displayed on a left and a right of the image display source.

2. The binocular see-through AR head-mounted display device, as recited in claim 1, further comprising a depth image acquisition module for collecting the scene depth image.

3. The binocular see-through AR head-mounted display device, as recited in claim 2, wherein the depth image acquisition module comprises an infrared grating launcher and an infrared camera.

4. The binocular see-through AR head-mounted display device, as recited in claim 3, wherein the depth image acquisition module further comprises a color camera for processing the scene depth image with target detection.

5. The binocular see-through AR head-mounted display device, as recited in claim 2, wherein the depth image acquisition module is a binocular range system formed by two color cameras.

6. An information display method for a binocular see-through AR (augmented reality) head-mounted display device, wherein a mapping relationship $\eta$ of pupil center coordinates and stared point screen coordinates, and a mapping relationship $\delta$ between stared point coordinates in a scene depth image within a user visual field and the stared point screen coordinates are pre-stored in the binocular see-through AR head-mounted display device; wherein the information display method comprises steps of:

measuring the pupil center coordinates when a user stares at a target object;

calculating the stared point screen coordinates when staring at the target object according to the mapping relationship $\eta$ and the pupil center coordinates when staring at the target object;

calculating the stared point coordinates in the scene depth image according to the mapping relationship $\delta$ and the stared point screen coordinates when staring at the target object;

dividing out an area around a stared point which coincides with a depth of the stared point from the scene depth image according to the stared point coordinates in the scene depth image;

mapping divided area coordinates onto screen coordinates according to the mapping relationship $\delta$, so as to obtain screen coordinate areas; and using the screen coordinate areas as reference positions, and respectively displaying an information source image of virtual information to be displayed on a left part and a right part of an image display source.

7. The information display method, as recited in claim 6, wherein using the screen coordinate areas as the reference positions, and respectively displaying the information source image of the virtual information to be displayed on the left part and the right part of the image display source specifically comprises:

directly displaying the information source image of the virtual information to be displayed on a left part and a right part of the screen coordinate area; or respectively displaying the information source image of the virtual information to be displayed on the left part and the right part of the image display source with a certain shift according to the screen coordinate area.

8. The information display method, as recited in claim 7, wherein the mapping relationship η is modified when the user uses the binocular see-through AR head-mounted display device for a first time, or every time the user uses the binocular see-through AR head-mounted display device.

9. The information display method, as recited in claim 8, wherein a modifying method of the mapping relationship η comprises steps of:
controlling the image display source for displaying a plurality groups of modification images in sequence on the left part and the right part, so as to project virtual overlapping images corresponding to the plurality groups of the modified images in front of the user;
measuring the pupil center coordinates when the user stares at each of the virtual overlapping images, for obtaining the pupil center coordinates corresponding to each of the virtual overlapping images; and
using all the pupil center coordinates corresponding to the virtual overlapping images for modifying the mapping relationship η.

10. The information display method, as recited in claim 6, wherein the mapping relationship η satisfies:

$$(ELnm_1, ERnm_2) \Leftrightarrow f(SLmn_1, SRnm_2);$$

wherein $(ELmn_1, ERnm_2)$ is the pupil center coordinates; $(SLmn_1, SRnm_2)$ is the stared point screen coordinates; wherein $n \in [1,N]$, $m_1 \in [1,M]$, $m_2 \in [1,M]$; N and M are respectively a vertical resolution ratio and a horizontal resolution ration of the left part and the right part of the image display source of the binocular see-through AR head-mounted display device; $f$ is a fitting function.

11. The information display method, as recited in claim 7, wherein the mapping relationship η satisfies:

$$(ELmn_1, ERnm_2) \Leftrightarrow f(SLmn_1, SRnm_2);$$

wherein $(ELmn_1, ERnm_2)$ is the pupil center coordinates; $(SLmn_1, SRnm_2)$ is the stared point screen coordinates; wherein $n \in [1,N]$, $m_1 \in [1,M]$, $m_2 \in [1,M]$; N and M are respectively a vertical resolution ratio and a horizontal resolution ration of the left part and the right part of the image display source of the binocular see-through AR head-mounted display device; $f$ is a fitting function.

12. The information display method, as recited in claim 8, wherein the mapping relationship η satisfies:

$$(ELmn_1, ERnm_2) \Leftrightarrow f(SLmn_1, SRnm_2);$$

wherein $(ELmn_1, ERnm_2)$ is the pupil center coordinates; $(SLmn_1, SRnm_2)$ is the stared point screen coordinates; wherein $n \in [1,N]$, $m_1 \in [1,M]$, $m_2 \in [1,M]$; N and M are respectively a vertical resolution ratio and a horizontal resolution ration of the left part and the right part of the image display source of the binocular see-through AR head-mounted display device; $f$ is a fitting function.

13. The information display method, as recited in claim 9, wherein the mapping relationship η satisfies:

$$(ELmn_1, ERnm_2) \Leftrightarrow f(SLmn_1, SRnm_2);$$

wherein $(ELmn_1, ERnm_2)$ is the pupil center coordinates; $(SLmn_1, SRnm_2)$ is the stared point screen coordinates; wherein $n \in [1,N]$, $m_1 \in [1,M]$, $m_2 \in [1,M]$; N and M are respectively a vertical resolution ratio and a horizontal resolution ration of the left part and the right part of the image display source of the binocular see-through AR head-mounted display device; $f$ is a fitting function.

14. An information display method for a binocular see-through AR head-mounted display device, wherein a mapping relationship η of pupil center coordinates and stared point screen coordinates, and a mapping relationship δ between stared point coordinates in a scene depth image within a user visual field and the stared point screen coordinates are pre-stored in the binocular see-through AR head-mounted display device; wherein the information display method comprises steps of:
measuring the pupil center coordinates when a user stares at a target object;
processing the scene depth image with target detection, so as to extract a plurality of optional targets;
calculating the stared point screen coordinates when staring at the target object according to the mapping relationship η and the pupil center coordinates when staring at the target object;
calculating the stared point coordinates in the scene depth image according to the mapping relationship δ and the stared point screen coordinates when staring at the target object;
defining the optional targets containing the stared point coordinates in the scene depth image as stared targets;
mapping stared target coordinates onto screen coordinates according to the mapping relationship δ, so as to obtain screen coordinate areas; and
using the screen coordinate areas as reference positions, and respectively displaying an information source image of virtual information to be displayed on a left and a right of an image display source.

15. An information display method for a binocular see-through AR head-mounted display device, wherein a mapping relationship η of pupil center coordinates and stared point screen coordinates, and a mapping relationship δ between stared point coordinates in a scene depth image within a user visual field and the stared point screen coordinates are pre-stored in the binocular see-through AR head-mounted display device; wherein the information display method comprises steps of:
measuring the pupil center coordinates when a user stares at a target object;
dividing areas with different depths in the scene depth image into a plurality of optional stared areas;
mapping optional stared area coordinates onto screen coordinates in sequence according to the mapping relationship δ, so as to obtain optional stared screen areas respectively corresponding to the optional stared areas;
calculating the stared point screen coordinates when staring at the target object according to the mapping relationship η and the pupil center coordinates when staring at the target object; and defining the optional stared screen areas containing the stared point screen coordinates as stared screen areas; and
using the stared screen areas as reference positions, and respectively displaying an information source image of virtual information to be displayed on a left and a right of an image display source.

16. An information display method for a binocular see-through AR head-mounted display device, wherein a mapping relationship η of pupil center coordinates and stared point screen coordinates, and a mapping relationship δ between stared point coordinates in a scene depth image within a user visual field and the stared point screen coordinates are pre-stored in the binocular see-through AR head-mounted display device; wherein the information display method comprises steps of:
measuring the pupil center coordinates when a user stares at a target object;

processing the scene depth image with target detection, so as to extract a plurality of optional targets;

mapping optional target area coordinates onto screen coordinates in sequence according to the mapping relationship δ, so as to obtain optional stared screen areas respectively corresponding to the optional targets;

calculating the stared point screen coordinates when staring at the target object according to the mapping relationship δ, and the pupil center coordinates when staring at the target object; and defining the optional stared screen areas containing the stared point screen coordinates as stared screen areas; and using the stared screen areas as reference positions, and respectively displaying an information source image of virtual information to be displayed on a left and a right of an image display source.

* * * * *